United States Patent
Mathews

[11] 3,757,797
[45] Sept. 11, 1973

[54] COMBINE
[76] Inventor: Bernard C. Mathews, P.O. Box 70, Crystal Lake, Ill. 60014
[22] Filed: Oct. 4, 1971
[21] Appl. No.: 186,053

Related U.S. Application Data
[63] Continuation-in-part of Ser. No. 132,727, April 9, 1971, which is a continuation-in-part of Ser. No. 818,295, April 22, 1969, Pat. No. 3,606,026.

[52] U.S. Cl. .................................. 130/24, 130/26
[51] Int. Cl. .......................................... A01f 12/30
[58] Field of Search .................. 130/26, 22 R, 24, 130/27 R, 27 E, 27 F, 27 HF, 27 Z

[56] References Cited
UNITED STATES PATENTS

| | | | |
|---|---|---|---|
| 3,049,129 | 8/1962 | Mark et al. | 130/26 |
| 1,884,114 | 10/1932 | Moroney | 130/24 |
| 1,917,536 | 7/1933 | McIntire | 130/24 |
| 1,202,762 | 10/1916 | Kranich | 130/26 |
| 1,210,571 | 1/1917 | Welty | 130/26 |
| 2,937,647 | 5/1960 | Allen et al. | 130/24 |
| 2,612,742 | 10/1952 | Heth | 130/27 R |
| 3,472,235 | 10/1969 | Van der Lely | 130/27 R |
| 3,193,995 | 7/1965 | Miller | 130/27 R |

Primary Examiner—Antonio F. Guida
Attorney—Foster York et al.

[57] ABSTRACT

The combine has a threshing cylinder, upper and lower sieves and a recovery sieve all located in the upper part of the casing, with the grain bin below. A fan is located forwardly of the lower sieve. The upper and lower sieves are vibrated with an orbiting motion which cooperates with the air stream from said fan to separate grain from the threshing mix on the sieve surface. The upper and recovery sieves have fish backs which maintain the straw in a bed above the sieve surface. The air stream blows the chaff up into the straw bed of the upper sieve. A dam between the upper and tailings sieve controls the depth of the straw bed. Tailings and clean grain from the recovery sieve are returned to the threshing cylinder and pass by a window in a duct so the operator can monitor the effectiveness of the sieve mechanism.

15 Claims, 10 Drawing Figures

COMBINE

This application is a continuation-in-part of my co-pending application, Ser. No. 132,727, filed Apr. 9, 1971, which in turn is a continuation-in-part of my then copending application, Ser. No. 818,295, filed Apr. 22, 1969, now U.S. Pat. No. 3,606,026 granted Sept. 20, 1971.

This invention relates to a combine for harvesting wheat and other grains, including corn.

In the usual combine now being marketed, the chaff and grain, as well as short straws and other particles, are shaken out of the straw bed by means of straw walkers, and delivered to the chaffer sieve by a return pan. The separation which takes place at the sieve surface is that of blowing the chaff away from the sieve and removing the grain through the sieve openings. Occasionally, if the bed of chaff on the sieve is thick, the thickness of the bed prevents proper blow off of the chaff, thus interfering with the separation and causing some of the chaff and grain to go into the tailings recovery portion of the grain separating mechanism.

The straw walker, having a separate drive, represents a considerable portion of the cost of the grain separating mechanism.

According to my invention, I eliminate the separate straw walker mechanism, and the separating action essentially is a blowing of the chaff up into or through the straw as contrasted with the aformentioned prior art arrangement in which the separating action is essentially the shaking out of the chaff and of the grain from the straw.

Furthermore, the air stream tends to float or fluidize the straw bed. This floating or fluid bed action is preferably accompanied by a motion of the sieve which has a substantial vertical component, one type of such motion being the orbiting motion described in my aforesaid copending applications. The rate of motion of the sieve is sufficiently slow that without flotation by the air stream or the push of material being added to the front of the sieve, the progress of the threshing mix along the sieve is very slow, both for the grain and for the straw.

The combination of the air stream and the vertical motion maintains the straw loose so as to promote the shaking out of the grain and chaff.

However, one difficulty encountered in this type of separation is that if the force of the air stream over the sieve area is not uniformly distributed, the air stream tends to concentrate in areas where the bed of mix is thin or non-existent. Then proper separation does not occur at other parts of the sieve area where the bed is thicker because of insufficient air. Where substantially all of the air escapes through a by-pass, the condition can be referred to as a "blow out."

According to my invention, I provide a dam which tends to build up the bed thickness to the extent where air stream localization and blow out does not occur. Thus, there is disposed across the path of the air stream a sufficient amount of straw as to serve as a porous barrier and air flow equalizer in order to permit the separating action to take place.

By eliminating the straw walkers, I also increase the "residence" time of the straw in the sieve zone, that is, over the sieve, in inverse ratio to the harvesting rate so that there is greater opportunity for the residual grain to be dropped out of the straw at lesser harvesting rates. That is, as the amount of material harvested per minute decreases, the residence time increases.

I have also found that the separating action is improved if the upper sieve is provided with fishbacks or fins having rearwardly aggressive teeth which maintain some of the straw, and particularly the longer pieces, above the mix which lies directly on the surface of the sieve. The latter I refer to as the surface bed, whereas the straw which rides on the fins, I refer to as the straw bed. The gap between the straw bed and the surface bed permits a more efficient grain separation because it provides more room for the chaff to acquire the upward motion imparted to it by the air stream.

One advantage of the present arrangement is that when feeding of mix to the sieve is discontinued, as when making a turn at the end of a field, the straw bed remains for a short period, such as one-half minute to a minute or two with the result that the separation on the sieve surface continues without blow out. In other words, the straw does not immediately walk back along the fins and climb over the dam so as to allow the escape of air.

Also, when a heavier charge of mix is fed onto the bed, the rate of flow over the dam is increased almost immediately. Therefore, the various elements cooperate to maintain a rate of straw flow which is about equal to the rate of harvesting, and in which the thickness of the straw bed is either substantially uniform, or else does not decrease below a certain minimum with any degree of rapidity.

In this connection, my invention also provides improved means for feeding the straw positively to the sieve so as to maintain the rate of straw flow.

My arrangement also provides a recovery or scalping sieve which recovers whatever small percentage of the grains that may be entrapped in the straw bed and not removed in the sieve zone. According to this aspect of my invention, I provide means for visually monitoring the amount of grain recovery so that this information can be used in regulating the travel speed of the combine.

Furthermore, with the present arrangement which eliminates the conventional straw walkers, it is possible to eliminate also the beater and stripper which are usually employed in conjunction with the threshing cylinder.

The particular separating mechanism above described is particularly suitable for the arrangement disclosed in which the separating mechanism is located above the grain bin for the reason that the elimination of the conventional straw walkers permits a corresponding reduction in the height of the combine, which is of the order of a foot or two.

Also, in my arrangement in which the grain bin is located directly beneath the grain separating mechanism, I eliminate the use of the clean grain elevator which is required when the grain bin is located above the separating mechanism. This reduces the proportion of broken grain, a certain amount of broken grain being unavoidable wherever elevators or augers are used.

Other objects, features and advantages will become apparent as the description proceeds.

With reference now to the drawings in which like reference numerals designate like parts:

FIG. 3 is a transverse section of the upper sieve taken along line 3—3 of FIG. 2;

Figure 1:
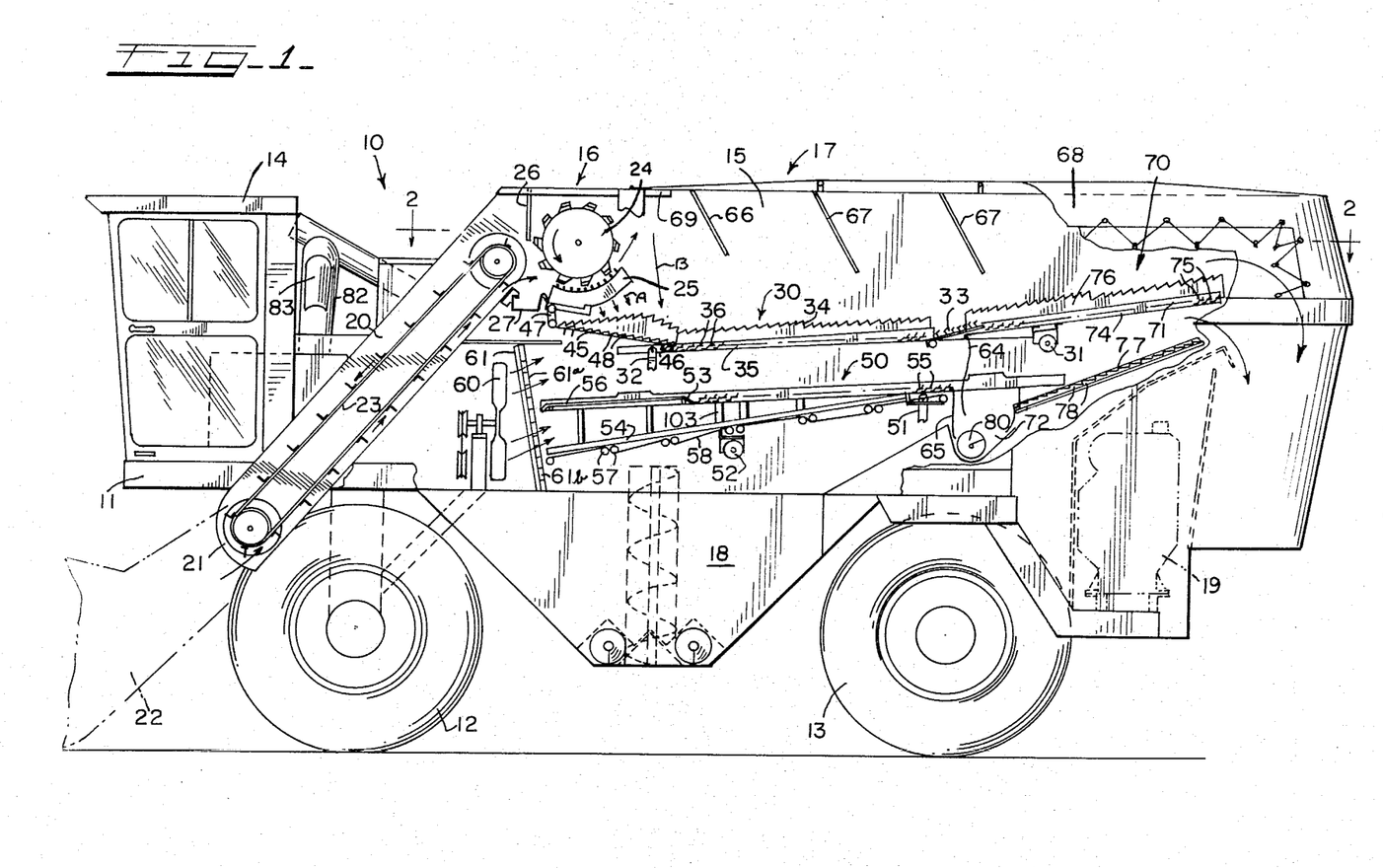
FIG. 1 is a side elevation of a combine embodying my invention, a portion of the side wall being removed, and some of the elements being shown diagrammatically.

FIG. 1 shows a combine 10 which includes a horizontal frame 11, two front wheels 12 and a rear wheel 13. An operator's cab 14 is mounted at the front end of the frame 11, and a casing 15 is mounted on the frame rearwardly of the cab, the grain threshing mechanism 16 and separating mechanism 17 being contained within the casing 15. A grain bin 18 extends downwardly from the frame 11 between the front and rear wheels 12 and 13, as shown in FIG. 1. A suitable internal combustion engine 19 is mounted at the rear end of the frame 11.

The combine also includes a feeder pan 45 which bridges the gap between the threshing mechanism 16 and the separating mechanism 17, and a recovery and recycling mechanism 70 located back of the separating mechanism 17.

Extending diagonally upward from beneath the cab is a feeder conduit 20 which communicates with the upper front end of the casing 15. The lower end of the feeder conduit terminates in a header mount 21 on which a header 22 can be removably mounted for harvesting a particular type of grain or crop. A slat type elevator 23 is disposed within the feeder conduit 20 and extends from the grain head 22 up to the threshing mechanism 16 which is located in the upper front portion of the casing 15. The threshing mechanism comprises a rotatably mounted threshing cylinder 24 and a concave 25 cooperating therewith. A removable vertical plate 26 is disposed forwardly of the threshing cylinder 24 and extends downwardly into proximity with the upper pulley of the slat type elevator 23 to prevent carry around of harvested crop and to prevent down draft in the upper front portion of the feeder conduit.

The threshing cylinder 24 is shown as having a discharge zone A beneath the concave 25 and a discharge zone B, as indicated by arrows in FIG. 1.

Bridging the gap between the elevator 23 and the concave 25 is a rock trap 27 in the form of a slidable drawer which may be removed through a door in the casing 15.

The separating mechanism comprises an upper sieve 30 and a lower sieve 50. The upper sieve is supported at its rear end by cranks 31 and at its front end by links 32, whereas the lower sieve is supported at its rear end by links 51 and at its front end by cranks 52. Cranks, similar to cranks 31 and 52, may be substituted for links 32 and 51 as disclosed in the aforesaid copending applications, the linkage mechanism to be hereinafter described being designed to impart a comparable orbiting movement to the sieves. A pivotally mounted barrier 33 is located at the rear of sieve 30 and comprises a dam. The pivotal mounting permits the elevation of the dam to be adjusted so as to regulate the depth of the straw bed, as will be hereinafter explained.

The upper sieve 30 also has a plurality of laterally spaced longitudinally extending fish backs, preferably in the form of longitudinally oriented vertical strips of sheet metal, referred to herein as "fins" 34. The upper edges of the fins are of saw-tooth shape, which is unsymmetrical so as to be aggressive in the rearwardly direction.

Figures 2, 4, 5:
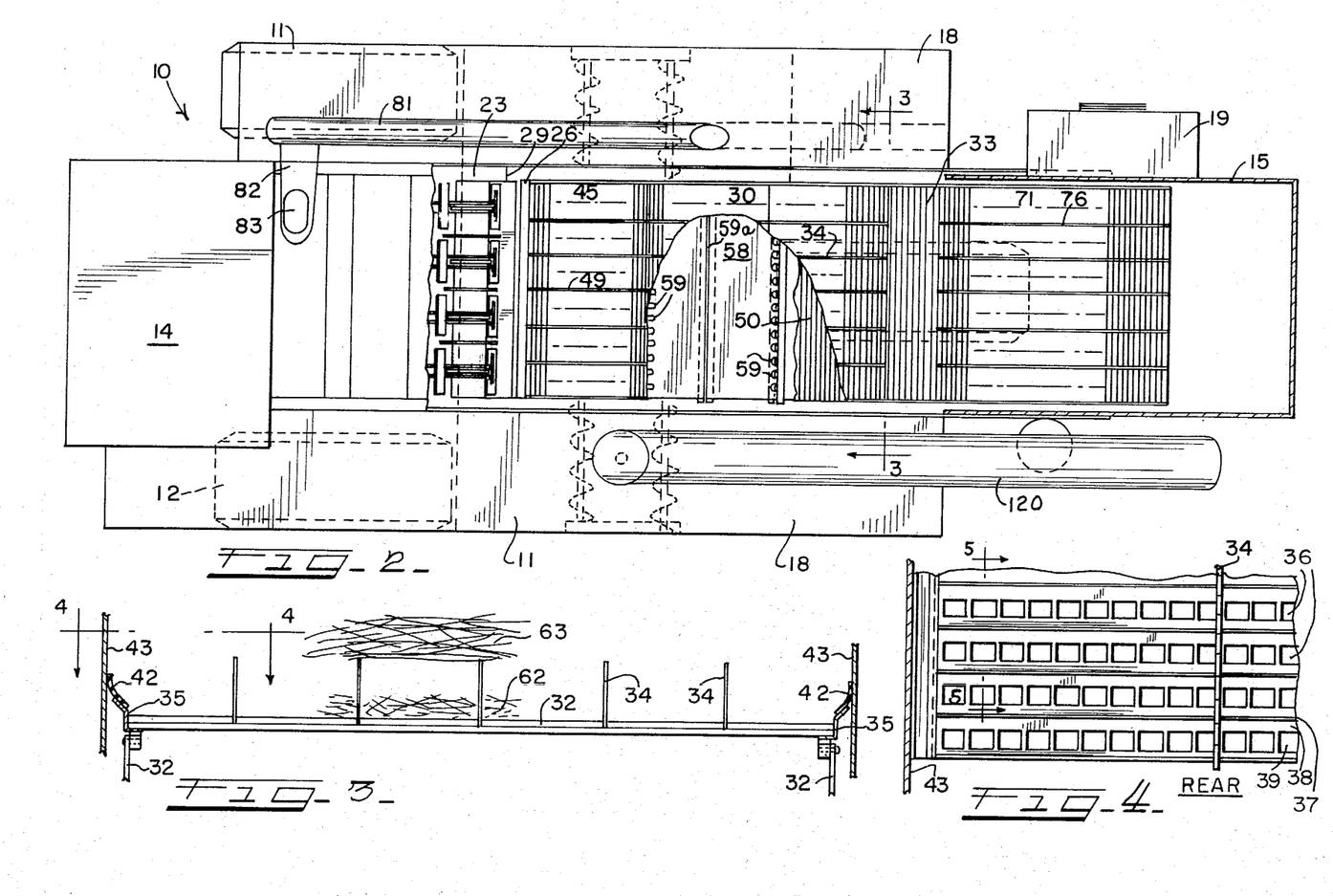
FIG. 2 is a plan section of FIG. 1 taken along line 2—2 of FIG. 1.
FIG. 4 is an enlarged plan view of a portion of the upper sieve taken along line 4—4 of FIG. 3.
FIG. 5 is a section taken along line 5—5 of FIG. 4.
Figure 5:
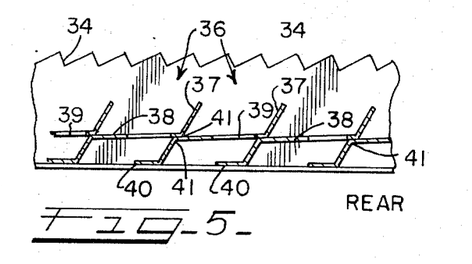

The sieve structure, as shown in FIG. 3, comprises side frame 35 supporting a plurality of transversely extending elements 36, which, as shown in FIGS. 4 and 5, are perforated and bent so as to provide ribs 37, bottom portions 38 having holes 39 therein, and shelves 40 underlying the holes 39. The sieve elements 36 are welded to each other at 41. The function of these portions of a sieve element is more fully explained in my aforesaid copending applications.

Flexible side seals 42 on the side frames 35 engage the side walls 43 of the casing 15.

An imperforate feed pan 45 is pivoted at 46 at its rear end to the upper sieve 30 and is supported at its front end by a link 47 which is pivotally connected to the concave 25 by suitable means. The link is an imperforate member extending the full width of the machine. The pan 45 is also provided with longitudinally extending fins 49 which overlap the fins 34 of the upper sieve 30.

Since the pan is reciprocating back and forth and slopes downwardly toward the rear, mix from the discharge zone A will slide down the pan to the front part of the upper sieve 30. Preferably, the pan 45 is provided with an irregular surface, shown here as steps 48 which are aggressive toward the rear, to facilitate the rearward movement of the mix onto the upper sieve 30.

The structure of the lower sieve 50 comprises an upper frame 53 and a lower frame 54. Sieve elements 55, like elements 36, are supported by the upper frame 53. In front of the sieve elements 55 is an imperforate cleaning pan 56 which also serves as a divider for the air stream. Transverse rods 57 are carried by the lower frame 54 and serve to support a canvas barrier 58 having a number of slots 59, as shown in FIG. 2.

Disposed forwardly of the lower sieve 50 is a fan 60 located in a suitable plenum. The fan is preferably of the axial delivery or propeller type, in which case there are two or more fans spaced side by side to provide an air stream which extends for the full width of the casing 15. A shutter 61 is disposed between the fan and the lower sieve structure 50. Preferably it is a checkerboard type shutter, as shown in the aforesaid copending applications, and is made in two independently adjustable parts, an upper part 61a and a lower part 61b.

In operation, the air stream delivered by the fan 60 is divided into two parts by the cleaning pan 56, the upper part passing into the space between the upper and lower sieves, and the lower part passing into the space between the lower sieve elements 55 and the canvas barrier 58. A flexible canvas curtain 64 depends from the upper sieve, just behind the sieve elements 55 of the lower sieve, and tends to block off the space between the upper and lower sieves 30 and 50. Thus, the major portion of the upper air stream will be deflected upwardly through the upper sieve. However, the flexibility of the curtain and the sieve motion cause a certain amount of the upper air stream to bleed into the tailings trough 72.

A second curtain 65 depends from the rear part of the lower sieve structure 50 and cooperates with the canvas barrier 58 to reduce the amount of air blowing through the upper part of the bin 18, thus avoiding eddy currents which might draw chaff down into the grain bin.

As pointed out in the aforesaid copending applications, a major portion of the cleaning is effected at the sieve elements 36; a final cleaning occurs as the grain drops from the upper sieve to the lower sieve. However, where, as here, there is a heavy concentration of grain dropping through the first few sieve elements 36 due to the feed pan arrangement 45, the corresponding elements 55 of the lower sieve would become overloaded with only partially cleaned grain. The cleaning pan 56 by interrupting the movement of incompletely cleaned grain into the bin 18 subjects the grain to the air stream for a greater period of time as the grain tumbles back and forth, and finally works its way either over the front edge or into the first few sieve elements 55.

At other points the grain dropping through the upper sieve 30 passes through the lower sieve 50 onto the barrier 58, and thence through the slots 59 into the grain bin 18.

Any larger particles which may remain on the surface of the lower sieve are subjected to the lower part of the air stream, and tend to be walked rearwardly to the tailings trough 72 by the combination of the orbiting action and the air stream.

OPERATION OF SIEVE 30

As the crop is fed by the elevator 23 to the theshing cylinder 24 and carried thereby across the bars of the concave 25, a substantial portion of the threshed grains and chaff will drop through the concave at the discharge zone A which overlies the front part of the feed pan 45. The reciprocating motion of the feed pan will feed this mix downhill and rearwardly to the front part of the upper sieve 30.

The major portion of the straw is discharged over the rear end of the concave 25. Located rearwardly of the threshing cylinder 24 is a deflector 66 which is preferably in the form of a flexible or hinged hanging curtain.

The velocity of the straw and other particles thrown out by the cylinder drives it upwardly into engagement with a steel top plate 69 or with the deflector 66 from which it rebounds, providing the discharge zone B. The rear part of the feed pan 45 underlies the discharge zone B, although the discharge zone B may also overlap the front of the main sieve 30. This arrangement prevents the occurrence of any gap in the straw bed at the front of the sieve 30.

The mix from discharge zone A which is fed by the feed pan 45 to the upper sieve elements 36 will contain a certain amount of straw and other particles, as well as the chaff and grain.

However, the major portion of the straw which is received on the sieve is that which comes over the end of the concave and hence will overlie the feed pan mix. The longer pieces of straw will be caught on the fins 34 and thus will be spaced above the mix which rests directly on the elements 36 and which forms the surface bed, indicated by the reference numeral 62 in FIG. 3.

The straw which is held on the fins forms a straw bed 63 which, in the case of a heavy crop having a large portion of long straws, represents a substantial barrier to the air stream traversing the upper sieve. This barrier is a porous barrier and the purpose of the dam 33 is to regulate the depth of the straw bed and hence the porosity. In a situation where the grain is merely topped, the straws may all be comparatively short, with the result that there is very little straw riding on the fins. Here the surface bed is much thicker because it contains a much greater proportion of straw and here the elevation of the dam 33 also controls the thickness of the straw.

In either event, the major portion of the straw overlies the mix which passes through the concave, and the straw is thick enough to provide sufficient resistance to the air blast as to make local thickness variations of inconsequential effect in establishing a low resistance by-pass in any particular place.

An improved separating action is provided by imparting a substantially circular orbiting motion to the upper sieve. The orbiting speed is somewhat slower than the reciprocating speed used in the conventional Closz sieve. This combination of a relatively slow orbiting movement with a sieve surface which has transverse ribs 37 or equivalent aggressive surface characteristics cooperates with the air stream to provide an improved separating action, as pointed out in the aforesaid copending applications.

The advantage of the fins 34 is that in a thick crop, the straw is maintained away from the surface bed 62, leaving a space between them which, if not empty, at least represents a much less dense distribution of material. This permits greater action and more efficient chaff from grain separation than would otherwise occur in a thick crop.

The provision of the dam 33 therefore assures that sufficient straw will be available as to avoid localized by-passing of the air stream which would destroy the cooperation of the orbiting motion and the air stream. In essence, the arrangement is such that the straw performs an air flow equalizing function.

In the case of a blanked concave in which practically all of the material is ejected at the discharge zone B, the straw and the smaller particles will not be stratified at the time they initially drop onto the feed pan 45 and the sieve 30. However, the fins 34 cause the total mix to separate into a surface bed and a straw bed as the smaller particles are shaken out of the straw.

THE DAM 33

Figures 6, 7, 8, 9:
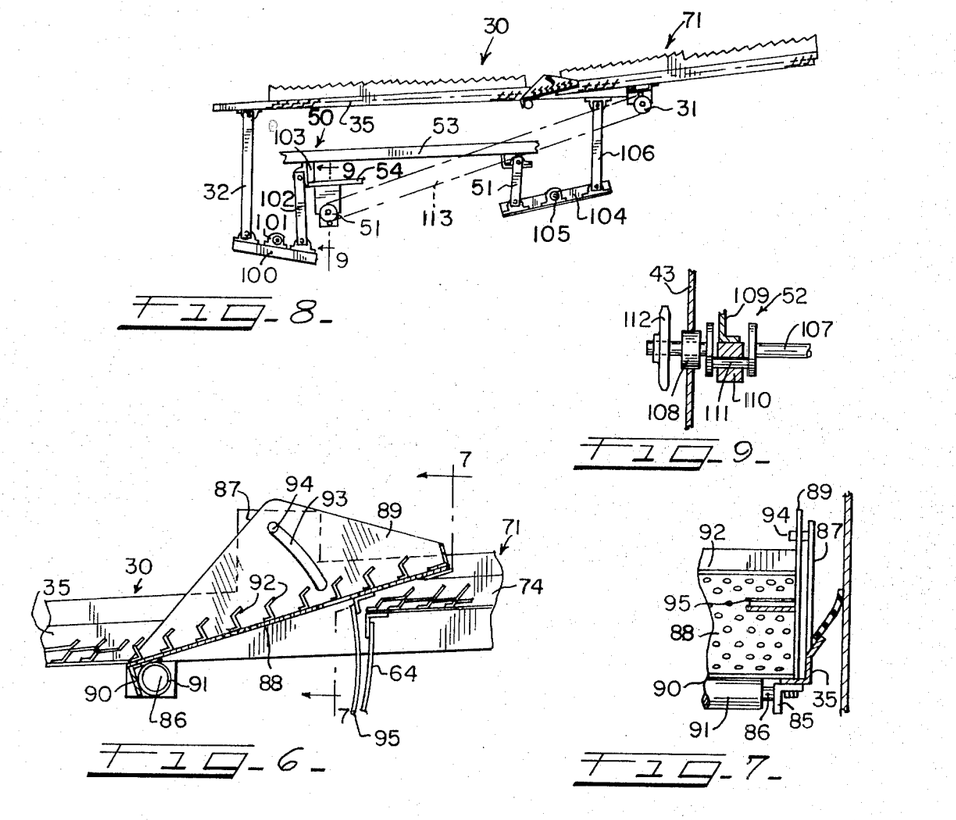
FIG. 6 is a detailed vertical section showing the dam and its relationship to adjacent parts.
FIG. 7 is a vertical section taken along line 7—7 of FIG. 6.
FIG. 8 is a side elevation of the upper sieve, a portion of the lower sieve, and the orbiting mechanism for driving same.
FIG. 9 is a vertical transverse section taken along line 9—9 of FIG. 8.

The construction of dam 33 is shown in FIGS. 6 and 7. Oppositely disposed brackets 85, as shown in FIG. 7, are removably secured to the side frames 35 of the upper sieve at the rear end thereof for mounting the dam 33. Each bracket 85 has a pivot pin 86. The dam itself is formed of perforated sheet metal 88 having side flanges 89. An angle iron 90 is mounted underneath the sheet 88 at the front edge and extends across the sieve from one pin 86 to another. A sleeve 91 welded to the angle iron 90 at each side receives the pin 86 so that the sheet 88 may be rotated on the pins. The surface of the perforated sheet metal is provided with transverse ribs 92.

A plate 87 on each side frame 35 carries a guide pin 94. The side flanges 89 are each provided with an arcuate slot 93 which receives the guide pin 94. Suitable nut means may be provided for the guide pins in order to maintain the dam in its angularly adjusted position. Depending from the sheet 88 is an arcuate plate 95 which extends the full width of the sieve and cooperates with the curtain 64 to prevent the loss of air at this point, that is, at the gap between the lower surface of the dam and the recovery sieve 71.

In operation, the elevation of the dam can be adjusted according to the nature of the crop to be harvested and the desired thickness of the straw bed. The orbiting motion of the sieve and the air stream causes the straw to climb up over the dam onto the recovery sieve 71, but the rate of movement of the straw from the upper sieve 30 to the recovery sieve 71 appears to be more a function of the rate at which the straw is forced onto the front of the upper sieve 30, than of the sieve motion. As previously indicated, if the feeding of mix to the sieve is discontinued, as when making a turn at the end of a field, the straw bed does not continue to walk to the rear at the same rate as during harvesting, but it remains on the upper sieve for a short period such as from one-half minute to a minute or two, with the result that the separation of grains from the mix on the sieve surface continues without blow out.

Disposed behind the deflector 66 are one or more flexible or hinged curtains 67 which tend to prevent dissipation of the straw bed by the air stream, and in the case of a heavy straw bed, serve to maintain the straw in contact with the fins 34. The top of the casing 15 is in the form of a removable substantially impervious tarpaulin 68 maintained in place by suitable lacing. This permits easy access to the separating mechanism 17.

RECOVERY AND RECYCLING MECHANISM 70

The recovery and recycling mechanism 70 comprises a recovery sieve 71 located behind the upper sieve 30 and above a tailings trough 72. The recovery sieve 71 comprises side frames 74 which support a suitable sieve structure having rearwardly aggressive surface characteristics. The same may be of wire mesh, or perforated metal with transverse ribs, or they may be in the form of sieve elements 75 similar to the sieve elements 36. The recovery sieve also includes fins 76 similar to the fins 34.

A return pan 77 is located beneath the recovery sieve 71. Suitable means are provided for driving the recovery sieve 71 so as to shake out of the overlying straw bed any grains not removed by the upper sieve and for driving the return pan 77 to cause the grains to slide down the pan 77 to the tailings trough 72. The bleed air passing under curtains 64 and 65 blows chaff out at the rear.

As shown herein, the side frames 74 constitute extensions of the side frames 35 so that the recovery sieve 71 is driven with the upper sieve 30. The return pan 77 is suitably supported from the lower sieve 50 and moves therewith. The return pan is provided with forwardly aggressive steps 78, and is disposed at a very substantial forwardly facing downward slope to force movement of grains in a direction opposite to that which is naturally induced by the orbiting motion of the pan, and opposite to the force of the bleed air passing out between recovery sieve 71 and return pan 77.

In addition to the recovery of threshed grains entrapped in the straw bed, any grain heads and other insufficiently threshed particles which pass over the dam 33, will be recovered through the openings in the sieve elements 75. Such openings may be somewhat larger than the openings in elements 36. As previously indicated, any tailings walked to the rear of the lower sieve 50 are also deposited in the auger trough 72.

A tailings auger 80 is disposed in the auger trough 72 and feeds the tailings transversely into an elevator pipe 81 (FIG. 2) from which it is conveyed into a duct 82, and then downwardly by gravity through the duct 82 and through an opening in the upper wall of the feeder conduit 20 so that the tailings will be carried back to the cylinder 24 by the slats of the elevator 23.

Due to the fact that my grain separating mechanism has a definite capacity or maximum separating rate, depending on the nature of the crop and the air adjustment, which is independent of the harvesting rate as determined by the forward travel speed of the combine, the amount of grain recovered from the recovery sieve 71 affords an indication as to whether the combine is travelling too fast. Thus, it is possible to utilize the recovery and recycling mechanism 70 as a monitoring system for judging the amount of grain lost over the end of the recovery sieve 71.

The duct 82 has an opening or window 83 therein, located right behind the operator's cab 14 and visible to the operator through a glass window, not shown.

By observing through the window 83 the amount of grain contained in the tailings, the operator is able to judge the effectiveness of the separating mechanism, and can regulate the forward travel speed of the combine accordingly.

With minimal experience, the operator is able to tell what amount of free grain in the tailings represents an end loss. Thus, in going from a thin crop into a thick crop, the travel speed can be regulated to avoid end loss.

DRIVE MECHANISM FOR SIEVES

The orbiting mechanism is shown in FIGS. 8 and 9. Upon the horizontal frame 11 there is mounted a rock lever 100. Its fulcrum is in the form of a bearing 101 which engages a suitable pivot pin (not shown) carried by the frame member 11. The front end of the rock lever 100 is pivotally connected to the link 32 which extends down from the side frame 35; the construction being duplicated on the other side of the grain separating mechanism. The rear end of the rock lever 100 is pivotally connected to a link 102 which extends downwardly from the lower sieve 50. The link is shown as being connected to the lower sieve at a vertical member 103 that connects the upper and lower frame members 53 and 54.

A second rock lever 104 is supported by a pivot pin (not shown) extending from a suitable structural member of the side wall, the construction being duplicated on the other side of the grain separating mechanism. The fulcrum is in the form of a bearing 105 which engages said pin. The front end of the rock lever 104 is pivotally connected to the link 51 which extends downwardly from the lower sieve 50 and the rear end of the rock lever is pivotally connected to the side frame 74 of the recovery sieve 71 by link 106. As viewed in FIGS. 1 and 8, clockwise rotation of the crank 31 will impart circular motion to the upper sieve 30 at this point. This circular motion will be transmitted through the linkage 106, 104, and 51 to the rear end of the lower sieve 50.

Similarly, clockwise rotation of the crank 52 will impart orbiting motion to the front end of the lower sieve 50, which will be transmitted through the linkage 102, 100 and 32, to the front end of the upper sieve 30.

Thus, the upper and lower sieves, each being supported at one end by a crank and at the other end by a link, are caused to move in an orbiting movement in opposed phase relationship. That is, as the upper sieve moves upwardly and rearwardly, the lower sieve will be moving downwardly and forwardly, and vice versa. The sieves counterbalance each other due to this opposed movement thus considerably reducing the vibration transmitted by the sieve to the casing 15. Also, the bellows action of the oppositely moving sieves provides a pulsation of the air stream as it moves upwardly through the upper sieve which assists in the separating action.

The two cranks 52 are mounted at opposite ends of a shaft 107 which extends across the casing from one side wall to the other, the ends of the shaft being mounted in bearings 108 in the side walls 43 of the casing 15, as shown in FIG. 9. The lower sieve 50 has a bracket 109 which carries bearing blocks 110 which engage the eccentric crank portion 111 of the crank 52. Thus, rotation of the shaft 107 will cause orbiting movement of the lower sieve 50. A sprocket 112 is secured to the shaft 107 externally of the side wall 43 of the casing 15, and is connected by a chain 113, to a similar sprocket affixed to the shaft of crank 31 so as to maintain the 180° phase relationship. The construction of crank 31 is the same as that of crank 52, and will not be repeated. The shaft 107 is driven through a suitable chain and sprocket at the end opposite to that shown in FIG. 9.

In the embodiment shown, the eccentricity of the crank 52 is 1 inch, providing a 2-inch throw for the lower sieve 50, and the eccentricity of the crank 31 is 2 inches, providing a 4-inch throw for the rear portion of the upper sieve. The fulcrum 105 is so located that the 4-inch vertical throw of the link 106 provides a 2-inch vertical throw for the link 51. Thus the vertical movement of both the front and back portion of the lower sieve is 2 inches.

The location of fulcrum 101 is such that the 2-inch vertical movement of the link 102 causes a 2½-inch vertical movement of the link 32. Thus the front end of the upper sieve 30 has a 2½ inch throw, whereas the portion of the recovery sieve 71 immediately above the crank 31 has a 4-inch vertical throw. The horizontal movement of all parts of the assembly 30–71 will be 4 inches. Thus the front end of the upper sieve orbits in an elliptical path having a 2½ inch vertical throw and a 4-inch horizontal throw, and the extent of the vertical throw increases as one approaches the rear end of the upper sieve, the throw at this point being about 3.7 inches. The advantage of this arrangement is that it is possible to provide a greater vertical throw for the recovery sieve 71 than the average vertical throw of the upper sieve 30, even though they are rigidly connected to each other by the integral side frames 35–74. The throw at the rear end of sieve 71 is 4.7 inches.

It has been found that a speed of as low as 160 r.p.m. for the cranks results in satisfactory separating action, providing the desired weightless action over the major portion of the upper sieve 30, and providing a greater agitating action for the recovery sieve 71 which is effective in shaking the grains out of the straw bed.

The motion of the sieve can also be a linear or arcuate reciprocating motion provided the reciprocating motion embodies a substantial vertical component. The vertical component of the sieve motion is essentially a harmonic motion, and the frequency of the reciprocating motion is somewhat slower than that generally applied to a Closz type sieve.

Figure 10:
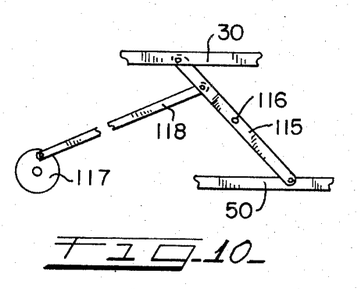
FIG. 10 is a diagrammatic elevation of a modified sieve driving mechanism.

An example of mechanism for imparting reciprocating motion to the sieves is shown in FIG. 10. The sieves 30 and 50 are supported at one end by a common link 115 pivoted at 116. A crank 117 rocks the link 115 through a connecting rod 118. A similar link supports the other end of each sieve.

In the case of either orbiting motion or reciprocating motion, the frequency in cycles per second (or speed in r.p.s.) should be equal to $K \sqrt{a/2}$ where $a$ is the magnitude of the vertical component of the sieve motion in inches, and $K$ is a numerical coefficient having a value of between 3.0 and 4.5, as indicated in aforesaid Ser. No. 132,727.

It is believed that the desired results are best obtained when the vertical component of the sieve motion is an inch or more and the frequency is less than substantially 250 c.p.m. as contrasted, for example, with the much higher frequencies used in vibratory settling and fluidization, such as 60 Hz with amplitudes of the order of hundredths or thousandths of an inch.

In the example given $K$ has a value of substantially 3.0 at the front of the sieve 30, and 3.6 at the rear. The low K value at the front of the sieve reduces the walking tendency so as to increase the residence time. The weightless characteristic at this speed range contributes to the fluid or floating action of the straw, but the speed is sufficiently slow as to prevent the grains adjacent the sieve surface from remixing with the overlying mix and straw.

The greater the K value, the greater the tendency to separate the grain from the straw by agitation. However, where the major portion of the grain from straw separation is caused by the stratification due to the discharge zones A and B, or by the use of the fins 49 and 34, or by both, it is possible to use frequencies corresponding to the lower K values.

It should be noted that at the lower K values, the advance of the straw bed is believed to be due largely to the longitudinal displacement of the straw at the front edge of the sieve 30 by the action of the feed pan 45. The downward and rearward slope of the steps 48 and of the teeth 49 causes a positive feeding action into the previously deposited straw and consequent displacement thereof. It will be noted that the link 47 provides a largely horizontal reciprocating motion for the feed pan 45. The mounting of the feed pan 45 between the link 47 and the sieve 30 and its connection to the latter provides a continuous path for the mix from the discharge zone A to the upper sieve 30.

The canvas barrier 58 can be made in two or more separate parts separated by a transverse gap 59a, as shown in FIG. 2, thus providing an additional opening for grain dropping into said bin.

Suitable unloading means 120 are provided for emptying the grain from the bin 18 into a truck, as shown in FIG. 2.

The disclosure of my aforesaid copending applications, Ser. Nos. 818,295 and 132,727 are hereby incorporated by reference into this application, insofar as said disclosures are consistent with the teachings of this application.

Although only preferred embodiments of my invention have been shown and illustrated herein, it will be understood that various modifications and changes can be made in the constructions shown without departing from the spirit of my invention, as pointed out in the appended claims.

I claim:

1. A combine comprising threshing mechanism having a mix discharge zone and a straw discharge zone, a main sieve located to receive the entire output thereof including mix from said mix discharge zone and straw from said straw discharge zone with said straw overlying said mix, air stream providing means, said main sieve being disposed across the air stream provided by said air stream providing means with said air stream passing upwardly through said sieve, a recovery sieve located behind said main sieve and connected thereto, means vibrating said main sieve and said recovery sieve in an orbital path, dam means located between said main sieve and said recovery sieve and including a transverse element extending for substantially the full width of said main sieve and operative to preserve the continuity of the bed formed by the straw overlying the mix on said main sieve, said straw bed providing a porous barrier traversed by said air stream.

2. A combine as claimed in claim 1 which includes means for positively feeding said output onto said main sieve and into the edge of the straw overlying same to displace same rearwardly.

3. In a combine as claimed in claim 1, a feed pan extending between said threshing mechanism and said main sieve, said feed pan being downwardly sloping to the rear and being pivotally connected at its rear end to the front end of said main sieve, link means supporting the front end of said feed pan for substantially horizontal reciprocating movement, whereby the orbital movement of said main sieve will cause the rear end of said feed pan to move with an orbital motion, said feed pan being imperforate.

4. A combine as claimed in claim 1 in which said main sieve has a plurality of longitudinally extending transversely spaced fins mounted on the upper surface thereof, said fins having rearwardly aggressive teeth formed on their upper edges for engaging at least a portion of said straw to maintain same spaced above the surface of said main sieve.

5. A combine as claimed in claim 1 in which said means for vibrating said sieve in an orbital path includes means for imparting to said sieve an orbital motion having a substantial vertical component, the magnitude $a$ of which in inches bears the following relationship to the frequency F in cycles per second of said vibrating means:

$$F \sqrt{a/2} = K$$

where $K$ is a numerical coefficient having a value of from 3.0 to 4.5.

6. A combine as claimed in claim 1 in which said transverse element is pivotally mounted on said sieve, and means to retain said element in an adjusted angular position to control the depth of said straw bed.

7. A combine as claimed in claim 1 in which said transverse element is provided with rearwardly aggressive surface characteristics to facilitate the movement of straw thereover.

8. A combine comprising threshing mechanism, a main sieve located to receive mix from said threshing mechanism, air stream providing means, said sieve being disposed across the air stream provided by said air stream providing means with said air stream passing upwardly through said sieve, a recovery sieve located behind said main sieve, a flexible baffle located between said main sieve and said recovery sieve and extending downwardly therefrom so as to cause the major portion of said air stream to traverse said main sieve and to permit a minor portion to bleed rearwardly into the space beneath said recovery sieve, said major air stream portion traversing said main sieve to blow the chaff portion of said mix upwardly into the straw overlying same, means for vibrating said sieves to promote the withdrawal of grain from the mix overlying said main sieve, and to shake grain out of the straw overlying said main sieve, said minor air stream portion blowing rearwardly the chaff dropping from said recovery sieve, and means for recycling the grain dropping from said recovery sieve.

9. A combine as claimed in claim 8 which includes an operator's station located forwardly of said threshing mechanism, said recycling means including a conduit means located adjacent said operator's station, and an opening in said conduit means visible to an operator located at said operator's station for monitoring the amount of grain passing through said recycling means.

10. A combine as claimed in claim 9 in which said recycling means also includes a trough located beneath said recovery sieve, second conduit means extending from said trough to an elevated point adjacent said operator's station, feeder means for feeding unthreshed crop to said threshing mechanism, said first mentioned conduit means extending downwardly between said elevated point and said feeder means and communicating with said second conduit means and said feeder means, and means for causing grain to flow from said trough through said second conduit means and into said first conduit means, past said opening, and into said feeder means.

11. A combine as claimed in claim 8 in which said main sieve and said recovery sieve are rigidly connected to each other to move as a unit, and in which said means for vibrating said sieves includes means for imparting to said sieves a harmonic motion having a substantial vertical component, the magnitude of the average vertical motion imparted to said recovery sieve being greater than the magnitude of the average vertical motion imparted to said main sieve whereby the shaking motion applied to said recovery sieve to shake the grain out of the straw is greater than the shaking motion applied to said main sieve.

12. A combine comprising threshing mechanism having a mix discharge zone and a straw discharge zone, a main sieve located to receive mix from said mix discharge zone and straw from said straw discharge zone with said straw overlying said mix, air stream providing means, said sieve being disposed across the air stream provided by said air stream providing means with said air stream passing upwardly through said sieve, a recovery sieve located behind said main sieve, a flexible baffle located between said main sieve and said recovery sieve and extending downwardly therefrom so as to cause the major portion of said air stream to traverse said main sieve and to permit a minor portion to bleed rearwardly into the space beneath said recovery sieve, dam means located between said main sieve and said recovery sieve to regulate the depth of the straw overlying the mix on said main sieve, said straw providing a porous barrier traversed by said major portion of said air stream and being operative to provide a distribution of said major air stream portion traversing said main sieve which is free from blow out and sufficiently uniform so as to provide at substantially all portions of said main sieve a separating action in which the chaff portion of said mix is blow upwardly into said straw, and means for vibrating said sieves to promote the withdrawal of grain from the mix overlying said main sieve and to shake grain out of the straw overlying said main sieve, said minor air stream portion blowing rearwardly the chaff dropping from said recovery sieve.

13. A combine comprising a casing, threshing mechanism located in the upper front part of said casing, separating mechanism located rearwardly of said threshing mechanism and including an upper sieve and a lower sieve, means vibrating said sieves, feed means located beneath said threshing mechanism and extending rearwardly to the front part of said upper sieve for conveying mix received from said threshing mechanism to said upper sieve, air stream providing means including a fan located forwardly of said sieves, a grain bin located beneath said lower sieve for receiving grain passing through said lower sieve, a substantially horizontal barrier supported by said lower sieve and located beneath same and above said grain bin and having openings formed therein to permit the passage of grain therethrough into said bin, and said barrier diverting the air stream from said fan upwardly through said lower sieve and tending to prevent the establishment of eddy currents within said grain bin.

14. A combine comprising a casing, threshing mechanism located in the upper front part of said casing, separating mechanism located rearwardly of said threshing mechanism and including a sieve, feed means located beneath said threshing mechanism and extending rearwardly to the front part of said sieve for conveying mix received from said threshing mechanism to said sieve, air stream providing means including a fan located forwardly of said sieve, a plurality of longitudinally extending transversely spaced fins integrally mounted on said sieve and having rearwardly aggressive teeth formed on their upper edges to engage at least a portion of the straw discharged from said threshing mechanism and maintain said straw spaced above the surface of said sieve, said air stream traversing said sieve upwardly and blowing chaff from the surface of said sieve upwardly into said straw, means for vibrating said sieve with a motion having a substantial vertical component to facilitate separation of the grains and the chaff on the surface of said sieve, and to walk rearwardly the straw overlying said fins at a rate substantially equal to the rate at which said straw is received from said threshing mechanism to prevent attenuation of the straw overlying said fins, said feed means comprising an imperforate feed pan pivotally connected at its rear end to the front end of said sieve and vibrating therewith, said feed pan also having a plurality of longitudinally extending transversely spaced fins having rearwardly aggressive teeth formed on their upper edges whereby straw engaged by said feed pan fins will be positively fed onto said sieve fins.

15. A combine comprising
threshing mechanism,
separating mechanism located rearwardly of said threshing mechanism and including an upper sieve and a lower sieve,
said upper sieve receiving the entire output of said threshing mechanism, said output comprising mix including straw,
means located beneath said lower sieve for deflecting air upwardly through said lower sieve,
air stream providing means located forwardly of said upper and lower sieves,
a portion of the air stream provided thereby passing into the space between said deflecting means and said lower sieve and thence upwardly through both of said sieves and
another portion passing into the space between said upper and lower sieves and thence upwardly through said upper sieve,
a recovery sieve located behind said upper sieve and moving therewith,
dam means located on said upper sieve at the rear thereof and forwardly of said recovery sieve to control the depth of the straw overlying said upper sieve,
said straw bed providing a porous barrier traversed by said air stream,
means vibrating said upper and lower sieves in an orbital path and in the same rotative direction but in opposed phase relationship to each other, and
means for recycling the grain dropping from said recovery sieve.

* * * * *